US011675628B2

(12) United States Patent
Eom et al.

(10) Patent No.: US 11,675,628 B2
(45) Date of Patent: Jun. 13, 2023

(54) METHODS FOR OPERATING STORAGE DRIVER IN CONTAINER ENVIRONMENT AND STORAGE DRIVER APPARATUSES

(71) Applicant: RESEARCH & BUSINESS FOUNDATION SUNGKYUNKWAN UNIVERSITY, Suwon-si (KR)

(72) Inventors: Young Ik Eom, Suwon-si (KR); In Hyeok Kim, Suwon-si (KR); Jong Gyu Park, Suwon-si (KR); Kwon Je Oh, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 540 days.

(21) Appl. No.: 16/751,593

(22) Filed: Jan. 24, 2020

(65) Prior Publication Data

US 2020/0257569 A1  Aug. 13, 2020

(30) Foreign Application Priority Data

Feb. 12, 2019  (KR) ............... 10-2019-001618 8

(51) Int. Cl.
*G06F 9/50* (2006.01)
*G06F 9/445* (2018.01)
(Continued)

(52) U.S. Cl.
CPC .............. *G06F 9/5077* (2013.01); *G06F 8/60* (2013.01); *G06F 9/445* (2013.01); *G06F 16/1734* (2019.01)

(58) Field of Classification Search
CPC .......... G06F 9/5077; G06F 8/60; G06F 9/445; G06F 16/1734; G06F 16/188;
(Continued)

(56) References Cited

U.S. PATENT DOCUMENTS 7,424,592 B1 *  9/2008  Karr ................... G06F 3/0605
                                                711/203
9,256,603 B1 *  2/2016  Bono .................. G06F 16/10
(Continued)

FOREIGN PATENT DOCUMENTS

CN       105103114 B  * 12/2018  ............ G06F 16/13
JP         7011127 B2  *  1/2022  ......... G06F 9/45558
(Continued)

OTHER PUBLICATIONS

Korean Office Action dated Sep. 8, 2020 in counterpart Korean Patent Application No. 10-2019-0016188 (6 pages in Korean).

*Primary Examiner* — David R Lazaro
*Assistant Examiner* — Berhanu Shitayewoldetadik
(74) *Attorney, Agent, or Firm* — NSIP Law

(57) ABSTRACT

Provided are a method for operating a storage driver in a container environment and a storage driver apparatus and a method for operating a storage driver according to an exemplary embodiment of the present disclosure includes: requesting downloading of an image for running a container; downloading a plurality of sub images associated with the requested image; allocating each of the plurality of downloaded sub images to an independent logical volume in a multi-layer based file system; and running a container using each of the plurality of allocated sub images.

20 Claims, 12 Drawing Sheets

(51) Int. Cl.
    *G06F 8/60*     (2018.01)
    *G06F 16/17*     (2019.01)
    *H04L 15/16*     (2006.01)
    *H04L 12/24*     (2006.01)
    *H04L 12/26*     (2006.01)
    *H04L 29/08*     (2006.01)
    *H04L 12/911*     (2013.01)

(58) Field of Classification Search
    CPC .... G06F 3/0665; G06F 3/0631; G06F 3/0643; G06F 3/0667; G06F 9/45558
    USPC .......................................................... 718/104
    See application file for complete search history.

(56) References Cited

U.S. PATENT DOCUMENTS

| | | | |
|---|---|---|---|
| 10,175,886 B1* | 1/2019 | Kantor | G06F 3/0631 |
| 11,216,563 B1* | 1/2022 | Veselov | H04L 63/1408 |
| 2004/0220960 A1* | 11/2004 | Ojeil | G06F 16/221 |
| | | | 707/999.102 |
| 2005/0172293 A1* | 8/2005 | Petruncola | G06F 9/5083 |
| | | | 718/105 |
| 2006/0031815 A1* | 2/2006 | Bhagia | G06F 8/61 |
| | | | 717/106 |
| 2008/0120459 A1* | 5/2008 | Kaneda | G06F 11/1456 |
| | | | 711/112 |
| 2008/0228770 A1* | 9/2008 | Halcrow | G06F 16/119 |
| 2008/0270585 A1* | 10/2008 | Sedukhin | G06F 9/541 |
| | | | 709/223 |
| 2010/0107163 A1* | 4/2010 | Lee | G06F 8/61 |
| | | | 718/1 |
| 2011/0231605 A1* | 9/2011 | Ogawa | G06F 3/0689 |
| | | | 711/E12.001 |
| 2012/0017111 A1* | 1/2012 | Kumarasamy | G06F 11/1441 |
| | | | 714/E11.03 |
| 2013/0304903 A1* | 11/2013 | Mick | G06F 9/44 |
| | | | 709/224 |
| 2014/0053150 A1* | 2/2014 | Barnett | G06F 9/45558 |
| | | | 718/1 |
| 2014/0109086 A1* | 4/2014 | Mizrahi | G06F 9/45558 |
| | | | 718/1 |
| 2014/0214915 A1* | 7/2014 | Dragon | H04L 43/0817 |
| | | | 709/201 |
| 2016/0077744 A1* | 3/2016 | Pundir | G06F 3/0608 |
| | | | 711/103 |
| 2016/0162320 A1 | 6/2016 | Singh et al. | |
| 2016/0350081 A1* | 12/2016 | Kumar | G06F 8/30 |
| 2016/0378519 A1* | 12/2016 | Gaurav | G06F 9/5077 |
| | | | 718/1 |
| 2017/0180346 A1* | 6/2017 | Suarez | G06F 21/6209 |
| 2017/0308305 A1* | 10/2017 | Goel | G06F 3/0641 |
| 2018/0189121 A1* | 7/2018 | Jobi | G06F 9/455 |
| 2018/0321985 A1* | 11/2018 | Kakaiya | G06F 9/5077 |
| 2019/0042456 A1* | 2/2019 | Ginzburg | G06F 12/084 |
| 2019/0114081 A1* | 4/2019 | Engel | G06F 3/0661 |
| 2019/0220315 A1* | 7/2019 | Vallala | G06F 11/1482 |
| 2019/0354386 A1* | 11/2019 | Cahana | G06F 9/5016 |
| 2020/0042618 A1* | 2/2020 | Mukku | G06F 3/0649 |
| 2020/0142788 A1* | 5/2020 | Hu | G06F 9/5077 |
| 2020/0159698 A1* | 5/2020 | Das | G06F 16/182 |
| 2020/0220746 A1* | 7/2020 | Shribman | H04W 48/18 |
| 2020/0250087 A1* | 8/2020 | Bono | G06F 12/1441 |
| 2020/0250319 A1* | 8/2020 | Bacher | G06F 9/45558 |
| 2020/0264776 A1* | 8/2020 | Janse van Rensburg | G06F 3/0619 |
| 2021/0387163 A1* | 12/2021 | Wada | B01J 20/3085 |
| 2022/0156488 A1* | 5/2022 | Mokhtari | G06F 18/22 |

FOREIGN PATENT DOCUMENTS

| | | | |
|---|---|---|---|
| KR | 10-2017-0085072 A | 7/2017 | |
| WO | WO-2007136192 A1 * | 11/2007 | G06F 21/51 |
| WO | WO-2013164403 A1 * | 11/2013 | H04L 63/0227 |

* cited by examiner

METHODS FOR OPERATING STORAGE DRIVER IN CONTAINER ENVIRONMENT AND STORAGE DRIVER APPARATUSES

CROSS-REFERENCE TO RELATED APPLICATIONS

This application claims priority to Korean Patent Application No. 10-2019-0016188 filed on 12 Feb. 2019 in Korea, the entire contents of which are hereby incorporated by reference in their entirety.

BACKGROUND

1. Technical Field

The present disclosure relates to methods for operating a storage driver in a container environment and storage driver apparatuses.

2. Description of Related Art

A development operations (DevOps) environment is required, which enables rapid development and deployment of applications with rapid expansion of an IT market. With such a requirement, a Docker which is an open source platform for developing, installing, and executing the applications appears. The Docker helps automating container technology and easily using the automated container technology.

The container technology is a solution for solving a problem regarding how software is stably operated when the software moves from one computing environment to another computing environment. The container technology may be applied from a notebook of a developer to a test environment, from a staging environment to a production, and from a physical apparatus in a data center to a virtual machine in a private or public cloud. The container technology and virtualization technology may be slightly similar, but the container technology and the virtualization technology are differentiated in the following aspect. When the virtualization technology is used, a moved package becomes a virtual machine and an entire operating system and an entire application are all included in the virtual machine. A physical server driving three virtual machines has a hypervisor and three separate operating systems driven thereon. On the contrary, a container driving a single operating system shares an operating system kernel with a server driving an application contained in three containers and each container shares the operating system kernel with another container. A sharing part of the operating is read-only, while each container has its own mount for writing. Accordingly, using the container technology is more advantageous than using the virtualization technology in terms of efficiency of utilization of a computing resource.

The Docker is an open platform for developing, installing, and executing the application using the container technology. When the Docker is utilized, the application may be separated from an infrastructure and may manage the infrastructure like the application. The Docker helps faster installation, faster test, and faster deployment to shorten a cycle of executing coding and a code.

As such, in recent years, in a cloud computing environment of processing big data and machine running, a light and convenient container has been primarily used. This allows one server node to simultaneously use thousands containers to make a big contribution to enhancing utilization rate of an entire cloud.

However, various layers of all containers share one host file system, and as a result, a bottleneck phenomenon occurs in various layers. Features of respective layers are not considered and one file system is used, and as a result, an efficient operation becomes difficult. In other words, in a conventional container environment, various layers of all containers share one host file system, and as a result, the bottleneck phenomenon occurs in various layers. Further, since the feature of each layer is not considered, the efficient operation becomes difficult.

SUMMARY

Exemplary embodiments of the present disclosure have been made in an effort to provide methods for operating a storage driver in a container environment and storage driver apparatuses which separate and operate various layers of a container in respective file systems to use a file system optimized according to a feature of each layer and completely remove a bottleneck phenomenon.

According to one example embodiment of the present disclosure, provided is a method for operating a storage driver, which is performed by a storage driver apparatus in a container environment which includes: requesting downloading of an image for running a container; downloading a plurality of sub images associated with the requested image; allocating each of the plurality of downloaded sub images to an independent logical volume in a multi-layer based file system; and running a container using each of the plurality of allocated sub images.

In the requesting of the downloading of the image, running of a Docker may be requested using a predetermined image and downloading of an image for running the container may be requested through a Docker engine of the run Docker.

In the allocating of the independent logical volume, the plurality of downloaded sub images may be allocated to at least one lower layer, an upper layer, and a volume layer independently separated in the multi-layer based file system, respectively.

In the multi-layer based file system, at least one lower layer may be only readable, the upper layer may be readable and writable, and the volume layer may be sharable between the containers.

The at least one lower layer, the upper layer, and the volume layer may operate like one file system using a Union file system.

In the allocating of the independent logical volume, the downloaded sub images may be sequentially stored in the at least one lower layer.

In the allocating of the independent logical volume, each of the plurality of downloaded sub images may be allocated to the independent logical volume using a storage driver interface of the Docker.

In the running of the container, a write request may be stored in the upper layer, which is generated while the container is run.

In the running of the container, a life cycle of the upper layer may be managed the same as the life cycle of the container.

In the running of the container, the volume layer may be changed according to a command by a user of the storage driver.

Meanwhile, according to another example embodiment of the present disclosure, provided is a storage driver apparatus in a container environment, which includes: a storage module including an independent logical volume in a multi-layer based file system; a memory storing at least one program; and a processor connected to the storage module and the memory, in which the processor runs the at least one program to request downloading of an image for running a container, download a plurality of sub images associated with the requested image, allocate each of the plurality of downloaded sub images to an independent logical volume in a multi-layer based file system, and run a container using each of the plurality of allocated sub images.

The processor may request running of a Docker using a predetermined image and request downloading of an image for running the container through a Docker engine of the run Docker.

The processor may allocate the plurality of downloaded sub images to at least one lower layer, an upper layer, and a volume layer independently separated in the multi-layer based file system, respectively.

In the multi-layer based file system, at least one lower layer may be only readable, the upper layer may be readable and writable, and the volume layer may be sharable between the containers.

The at least one lower layer, the upper layer, and the volume layer may operate like one file system using a Union file system.

The processor may sequentially store the downloaded sub images in the at least one lower layer.

The processor may allocate each of the plurality of downloaded sub images to the independent logical volume using a storage driver interface of the Docker.

The processor may store a write request in the upper layer, which is generated while the container is run.

The processor may manage a life cycle of the upper layer the same as the life cycle of the container.

The processor may change the volume layer according to a command by a user of the storage driver.

Meanwhile, according to another example embodiment of the present disclosure, provided is a non-transitory computer readable storage medium including at least one program executable by a processor and when the at least one program is executed by the processor, the non-transitory computer includes commands allowing the processor to request downloading of an image for running a container, download a plurality of sub images associated with the requested image, allocate each of the plurality of downloaded sub images to an independent logical volume in a multiple layer based file system in the storage module, and run the container using each of the plurality of allocated sub images.

According to exemplary embodiments of the present disclosure, respective layers of a container can be independently operated.

According to exemplary embodiments of the present disclosure, performance is enhanced by removing a bottleneck phenomenon between layers and a file system according to a feature and a purpose of the layer is used, thereby supporting a more effective operation to be enabled.

DETAILED DESCRIPTION OF EXAMPLE EMBODIMENTS

Figure 1:
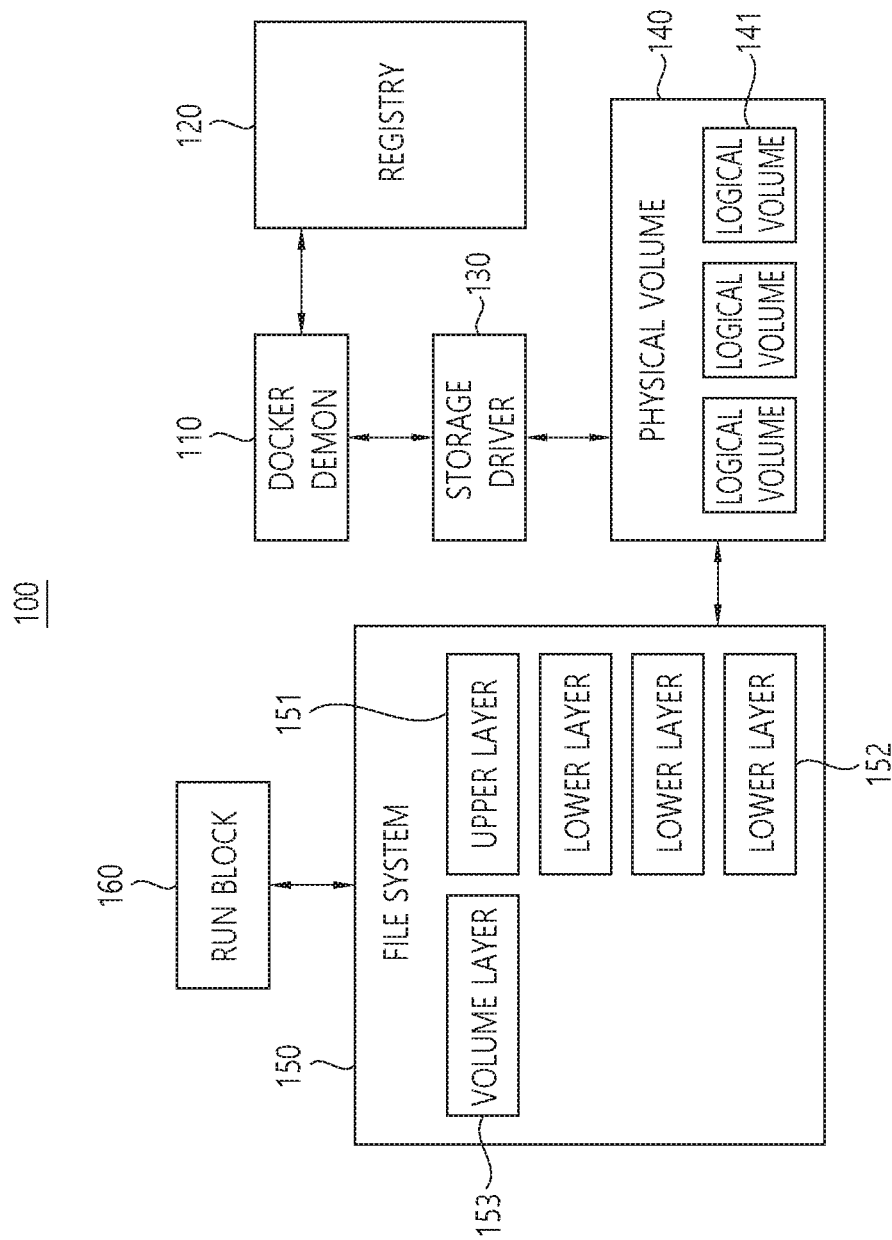
FIGS. 1 and 2 are diagrams for describing an operation of a storage driver in a container environment according to an exemplary embodiment of the present disclosure.

The present disclosure may be variously changed and have various exemplary embodiments and specific exemplary embodiments will be illustrated in the drawings and described in detail.

However, this does not limit the present disclosure to specific exemplary embodiments, and it should be understood that the present disclosure covers all the modifications, equivalents and replacements included within the idea and technical scope of the present disclosure.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present disclosure. A term 'and/of' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that a component is "directly connected to" or "directly accesses" another component, it is understood that no element is present between the element and another element.

Terms used in the present application are used only to describe specific exemplary embodiments, and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present disclosure will be described in more detail with reference to the accompanying drawings. In describing the present disclosure, the same reference numerals are used for the same components in the drawings and a duplicated description of the same components will be omitted for facilitating overall understanding.

Figure 2:
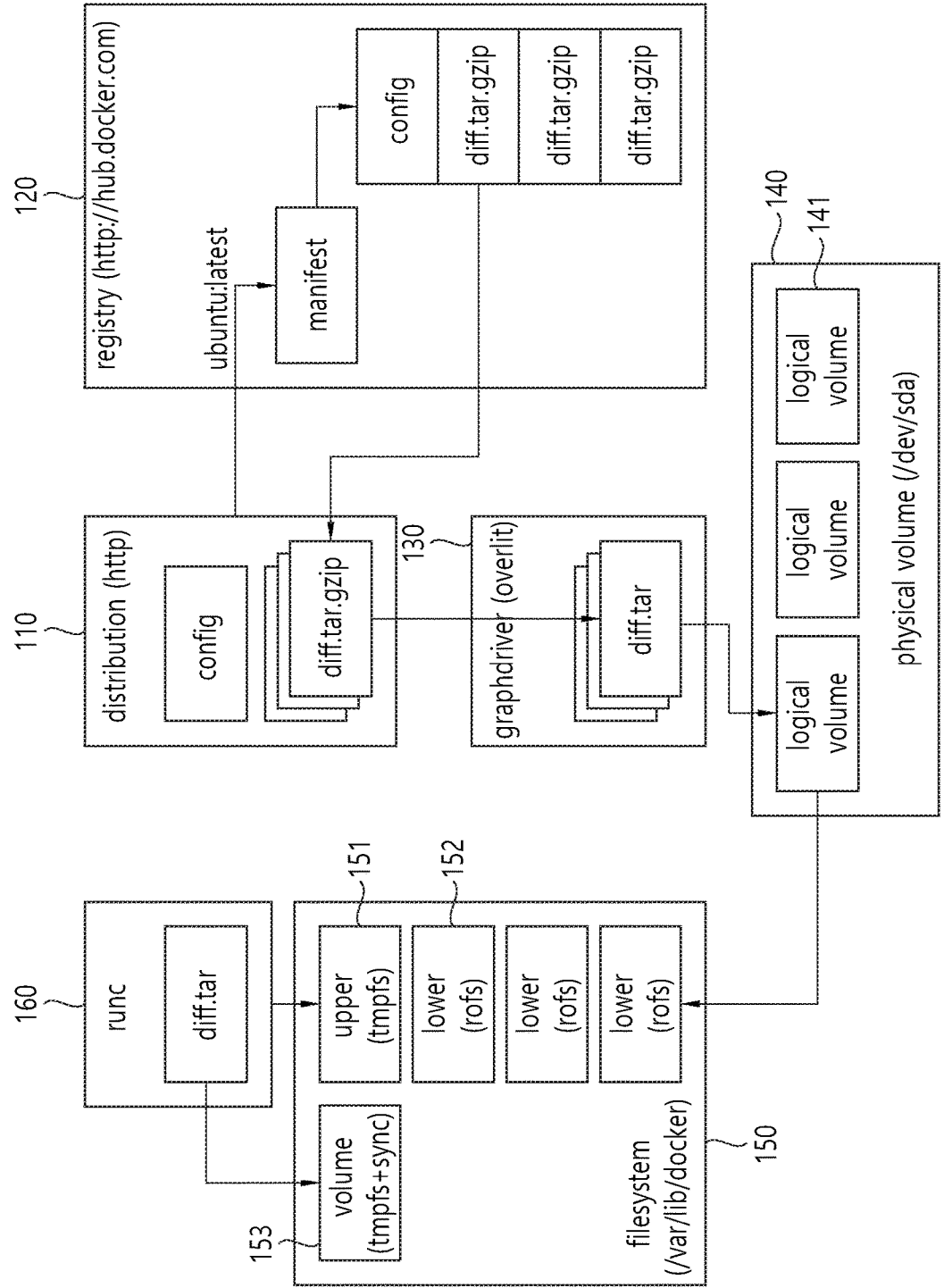

FIGS. 1 and 2 are diagrams for describing an operation of a storage driver in a container environment according to an exemplary embodiment of the present disclosure.

As shown in FIGS. 1 and 2, a container environment according to an exemplary embodiment of the present disclosure includes a Docker demon (distribution) 110, a registry 120, a storage driver (graphdriver) 130, a physical volume 140, a file system (filesystem) 150, and a run block (runc) 160. Here, the physical volume 140 includes a plurality of independent logical volumes 141. The file system 150 includes an upper layer 151, at least one lower layer 152, and a volume layer 153.

An exemplary embodiment of the present disclosure is divided into an only read lower layer 152 and a readable/writable upper layer 152, and a volume layer 153 which is sharable between containers and respective layers are allocated to different logical volumes and installed and then used by using the required file system 150.

As a result, in an exemplary embodiment of the present disclosure, the independent logical volume 141 is allocated for each layer used in the container and the required file system 150 is installed and operated therein to perfectly remove a bottleneck phenomenon which occurs in various layers and a file system is selected, which is suitable for a feature of each layer to enable an efficient operation.

A Docker which is a representative container platform provides a storage driver plug-in interface so as to manage the layer of the container in various forms. Therethrough, the read only lower layer 152 and the readable/writable upper layer 151, and the volume layer 153 which is sharable between the containers may be managed in desired forms. Therefore, in an exemplary embodiment of the present disclosure, a new form storage driver 130 is intended to be provided, which may use the required file system by allocating the independent logical volume to each layer by using the storage driver plug-in interface.

In FIG. 2, a process of operating a container storage driver according to an exemplary embodiment of the present disclosure will be described below.

Docker running is requested using a specific image (e.g., Ubuntu ISO image file).

The Docker demon (distribution) 110 requests ubuntu image downloading.

The Docker demon 110 is downloaded an ubuntu image from the registry 120. Here, the ubuntu image is divided into multiple sub images. Therefore, all sub images associated with the ubuntu image are downloaded.

The Docker demon 110 stores all corresponding sub images through the storage driver (graphdriver) 130.

The storage driver 130 according to an exemplary embodiment of the present disclosure stores each sub image in the independent logical volume 141 included in the physical volume 140.

When the storage driver 130 stores all sub images, the Docker runs a new container using the ubuntu image.

Since the conventional storage driver stores all sub images in one physical volume in the step of storing the sub image, the bottleneck phenomenon occurs when accessing (reading/writing) each sub image.

However, since the storage driver 130 according to an exemplary embodiment of the present disclosure stores all sub images in each logical volume 141, the bottleneck phenomenon may be fundamentally removed.

In general the physical volume 140 means one storage apparatus (e.g., SSD). The logical volume 141 virtualizes the physical volume 140 as if the logical volume 141 has multiple storage apparatuses by splitting the physical volume 140 as many as necessary.

Figure 3:
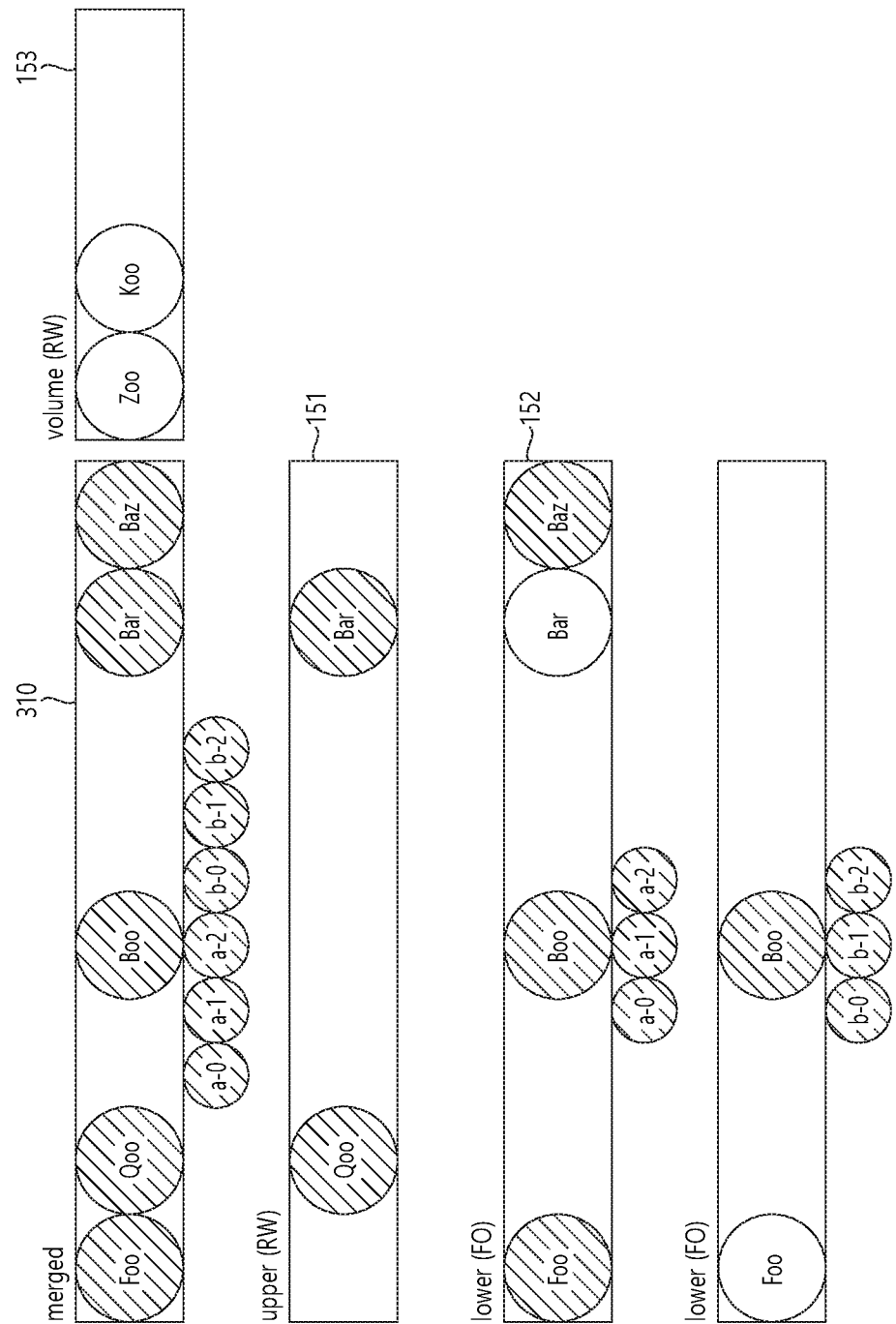
FIG. 3 is a diagram for describing a multiple layer based file system structure according to an exemplary embodiment of the present disclosure.

FIG. 3 is a diagram for describing a multiple layer based file system structure according to an exemplary embodiment of the present disclosure.

As shown in FIG. 3, the Docker splits the file system 150 for the container into multiple layers and manages the file system 150. The Docker stores the sub images of the ubuntu image in the lower layer 152 in sequence. The Docker stores a write request generated while the container is run in the layer 151 and guarantees the container to be run under the same environment when the container is restarted any time. Therefore, the upper layer 151 is generated simultaneously when a new container is generated and when the container is removed after the container ends, the upper layer 151 is removed. Last, the volume layer 153 is used when the container intends to maintain results even after the container ends.

The multiple lower, upper, and volume layers 151, 152, and 153 are made to be visible using a union file system like an overlay file system. The layers are actually divided into multiple layers, but shown as existing like a single layer 310.

Figure 4:
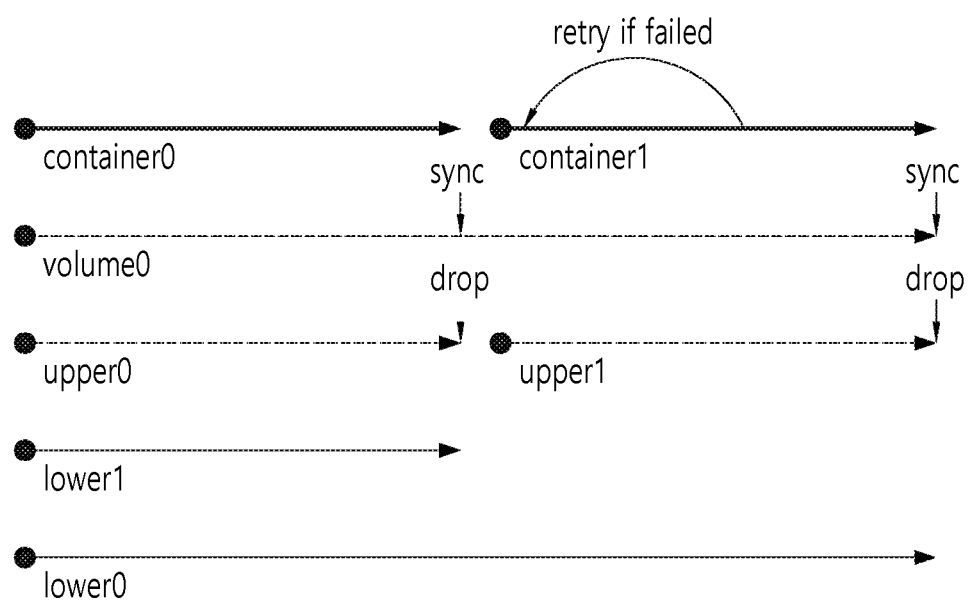
FIG. 4 is a diagram for describing life cycles of a Docker container and a storage according to an exemplary embodiment of the present disclosure.

FIG. 4 is a diagram for describing life cycles of a Docker container and a storage according to an exemplary embodiment of the present disclosure.

In FIG. 4, the life cycle of each layer described above and the life cycle of the container are compared with each other.

As shown in FIG. 4, lower layer 1 and lower layer 0 exist regardless of the container. Upper layer 0 has the same life cycle as container 0. Upper layer 1 has the same life cycle as container 1. In addition, volume layer 0 may also be generated, deleted, or used as a manager desires regardless of container 0 or container 1.

Figure 5:
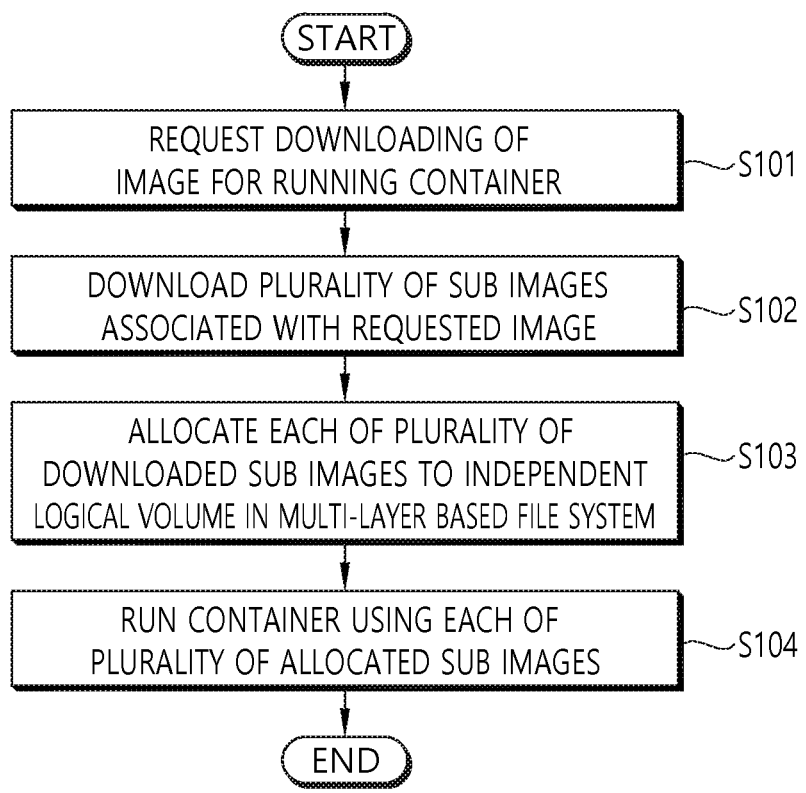
FIG. 5 is a flowchart for describing methods for operating a storage driver in a container environment according to an exemplary embodiment of the present disclosure.

FIG. 5 is a flowchart for describing methods for operating a storage driver in a container environment according to an exemplary embodiment of the present disclosure.

In a method for operating a storage driver in a container environment according to an exemplary embodiment of the present disclosure, layers of respective layers of all containers are made to operate in the container environment to ensure regionality and distinctiveness.

In step S101, the storage driver apparatus according to an exemplary embodiment of the present disclosure request downloading of an image for running the container.

In step S102, the storage driver apparatus downloads a plurality of sub images associated with the requested image.

In step S103, the storage driver apparatus allocates each of the plurality of downloaded sub images to the independent logical volume in the multiple layer based file system.

In step S104, the storage driver apparatus runs the container by using the plurality of respective allocated sub images.

Figure 6:
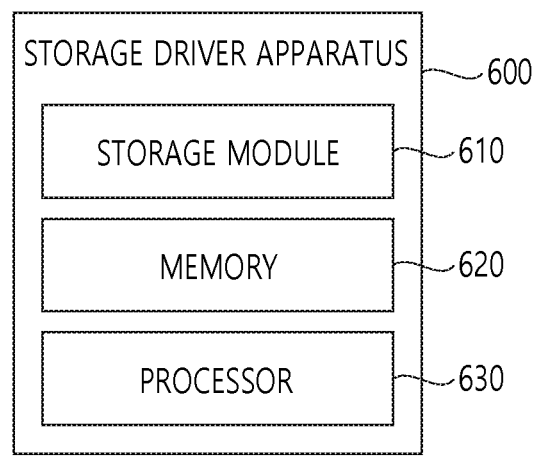
FIG. 6 is a configuration diagram for describing a configuration a storage driver apparatus in a container environment according to an exemplary embodiment of the present disclosure.

FIG. 6 is a configuration diagram for describing a configuration a storage driver apparatus in a container environment according to an exemplary embodiment of the present disclosure.

As shown in FIG. 6, a storage driver apparatus 600 according to an exemplary embodiment of the present disclosure includes a storage module 610, a memory unit 620, and a processor 630. However, all illustrated components are not required components. The storage driver apparatus 600 may be implemented by components more than the illustrated components and the storage driver apparatus 600 may be implemented by smaller components therethan.

Hereinafter, a detailed configuration and a detailed operation of each of the components of the storage driver apparatus 600 of FIG. 6 will be described.

The storage module 610 includes the independent logical volume in the multiple layer based file system.

The memory 620 stores at least one program.

The processor 630 is connected to the storage module 610 and the memory 620.

The processor 630 runs at least one program to request downloading of the image for running the container, downloads a plurality of sub images associated with the requested image, allocates each of the plurality of downloaded sub images to the independent logical volume in the multiple layer based file system in the storage module 610, and runs the container using each of the plurality of allocated sub images.

According to various exemplary embodiments, the processor 630 may request running of the Docker using a predetermined image and request downloading of the image for running the container through a Docker engine of the run Docker.

According to various exemplary embodiments, the processor 630 may allocate each of the plurality of downloaded sub images to at least one lower layer, at least one upper layer, and at least one volume layer which are independently separated in the multiple layer file system.

According to various exemplary embodiments, in the multiple layer based file system, at least one lower layer is only readable, the upper layer is readable and writable, and the volume layer is sharable between the containers.

According to various exemplary embodiments, at least one lower layer, at least upper layer, and at least one volume layer operate like one file system using a Union file system.

According to various exemplary embodiments, the processor 630 may store the downloaded sub images in at least one lower layer in sequence.

According to various exemplary embodiments, the processor 630 may allocate each of the plurality of downloaded sub images to the independent logical volume using the storage driver interface of the Docker.

According to various exemplary embodiments, the processor 630 may store a write request generated while the container is run in the upper layer.

According to various exemplary embodiments, the processor 630 may manage the life cycle of the upper layer to be the same as the lift cycle of the container.

According to various exemplary embodiments, the processor 630 may change the volume layer according to an instruction by a user of a storage driver.

FIGS. 7 to 10 are diagrams for describing a comparison result between an exemplary embodiment of the present disclosure and a conventional storage driver.

Figure 7:
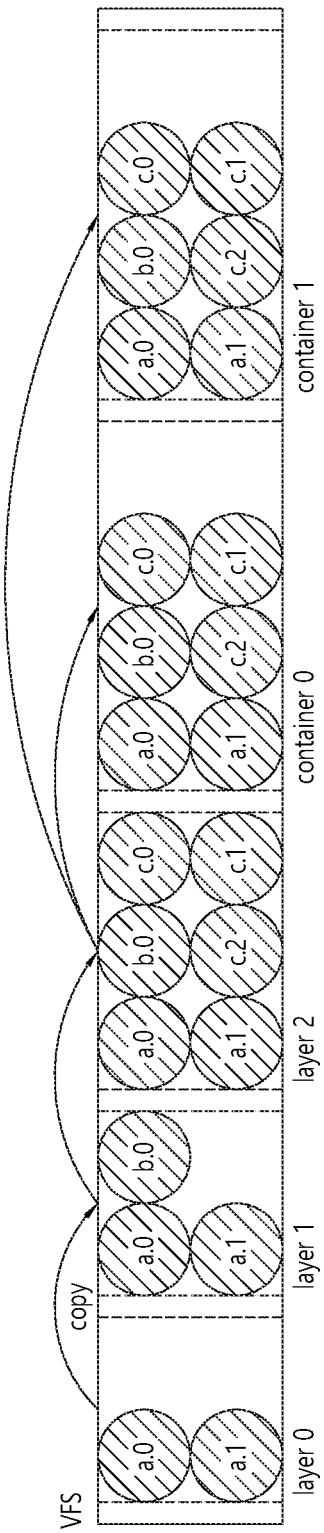
FIGS. 7 to 10 are diagrams for describing a comparison result between an exemplary embodiment of the present disclosure and a conventional storage driver.
Figure 8:
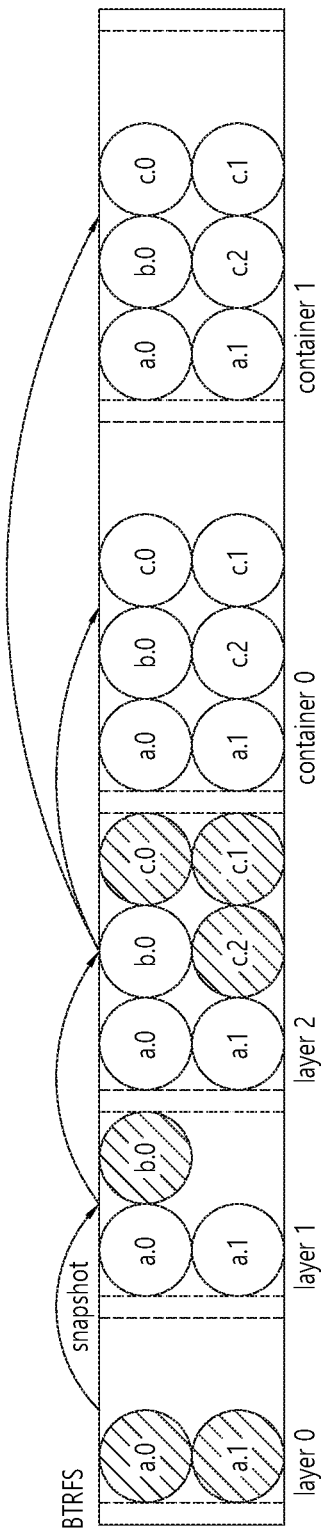
Figure 9:
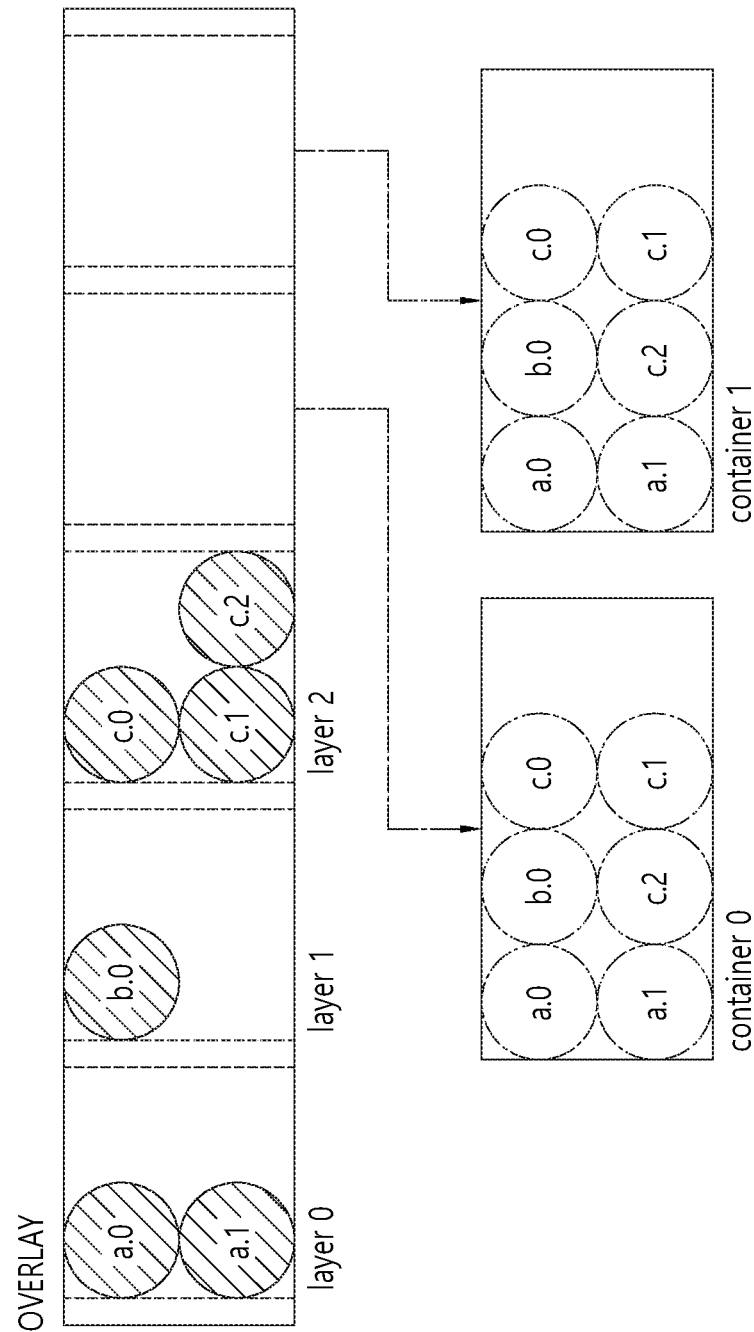
Figure 10:
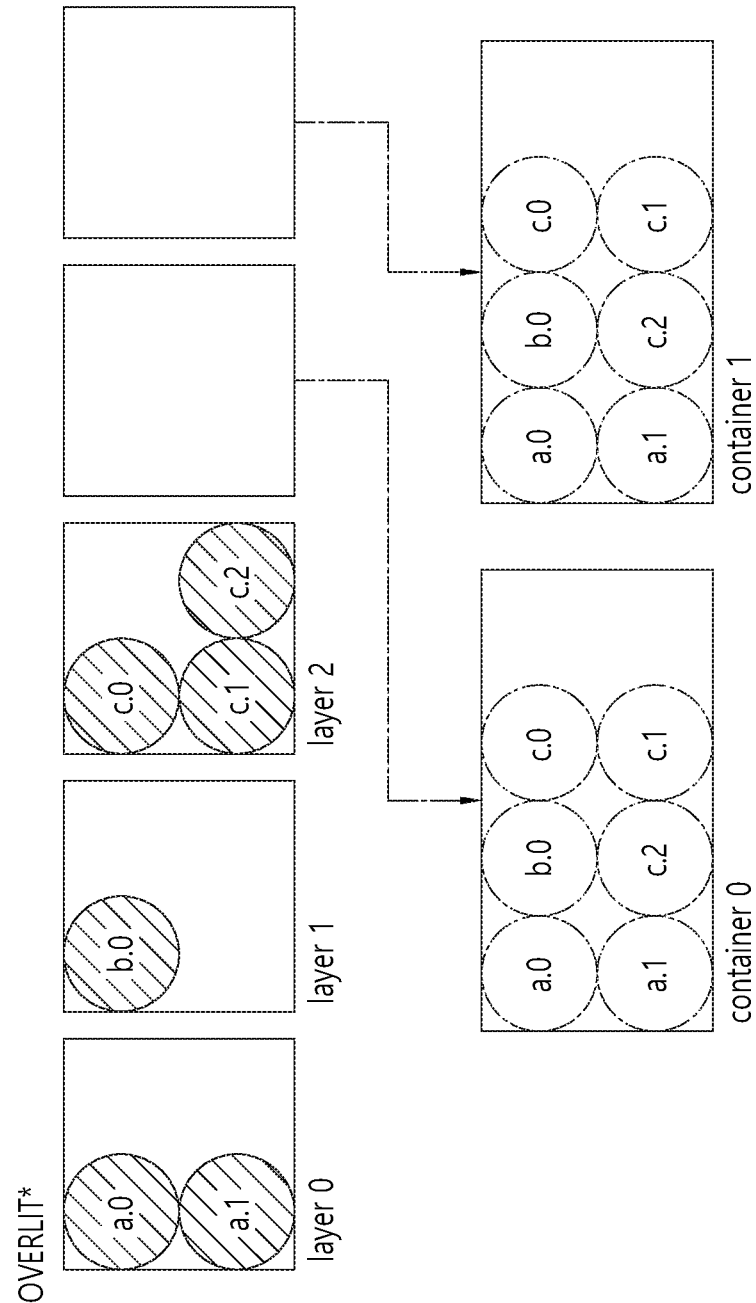

In all of conventional storage drivers (VFS, BTRFS, and OVERLAY) illustrated in FIGS. 7 to 9, the bottleneck phenomenon inevitably occurs after all because one physical volume exists in all layers.

However, since the storage driver (OVERLIT) according to an exemplary embodiment of the present disclosure stores all layers in each logical volume, the bottleneck phenomenon may be removed.

Figure 11:
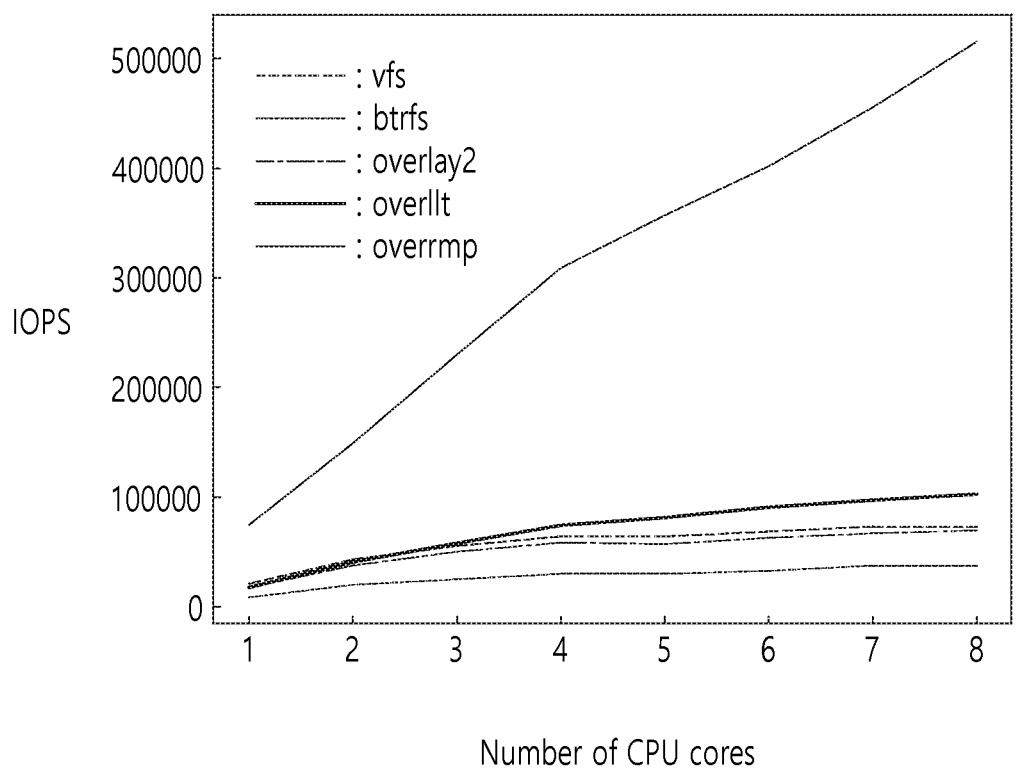
FIG. 11 is a diagram for describing a performance comparison result between an exemplary embodiment of the present disclosure and a conventional storage driver.

FIG. 11 is a diagram for describing a performance comparison result between an exemplary embodiment of the present disclosure and a conventional storage driver.

In order to measure extensibility of an exemplary embodiment of the present disclosure, it is checked how performance increases when operating one to 8 containers in one server node.

As shown in FIG. 11, the conventional storage drivers (vfs, btrfs, and overlay2) show a phenomenon in which the performed is congested by the bottleneck phenomenon even though the number of containers increases.

However, the storage driver (overlit) according to an exemplary embodiment of the present disclosure shows better extensibility by removing the bottleneck phenomenon. In particular, when a memory based file system (tmpfs) is used in the upper layer maintained only while the container is run (overtmp), extensibility in which the performance almost linearly increases is shown.

Figure 12:
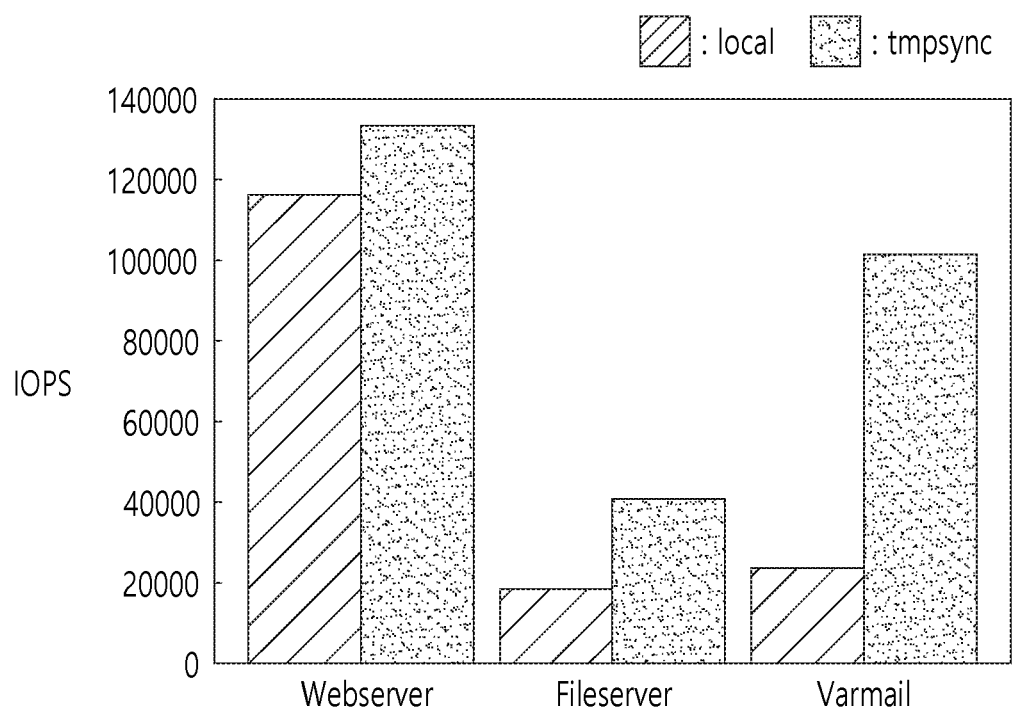
FIG. 12 is a diagram for describing a performance improvement result between an exemplary embodiment of the present disclosure and a conventional storage driver.

FIG. 12 is a diagram for describing a performance improvement result between an exemplary embodiment of the present disclosure and a conventional storage driver.

FIG. 12 shows how the performance is improved when the memory based file system (tmpfs) is used while the container operates and the volume layer sharable between the containers is moved to a normal file system after a task is completed to remove the bottleneck phenomenon which occurs during the operation.

As shown in FIG. 12, in an exemplary embodiment (tmpsync) of the present disclosure, the performance may be improved by 10 to 20% at least and the performance may be improved by three times or more at most according to a workload compared with local.

In an exemplary embodiment of the present disclosure, it is expected that the bottleneck phenomenon between the containers is removed a large cloud computing environment and overall operating cost may be reduced by enabling the efficient operation. In particular, when thousands of containers simultaneously operate in a server node having high performance, it is very important to remove the bottleneck phenomenon which occurs in a file system/storage layer. The exemplary embodiment has been determined as technology suitable for a high-efficiency computing environment recently targeted by all companies that operate a large data center.

The method for operating the storage driver in the container environment according to the exemplary embodiments of the present disclosure may be implemented as a computer readable code in a computer readable recording medium. The method for operating the storage driver in the container environment according to the exemplary embodiments of the present disclosure is implemented in a form of a program command which may be performed through various computer means and may be recorded in the computer readable recording medium.

A non-transitory computer readable storage medium including at least one program executable by a processor may be provided and when the at least one program is executed by the processor, the non-transitory computer includes commands allowing the processor to request downloading of an image for running a container, download a plurality of sub images associated with the requested image, allocate each of the plurality of downloaded sub images to an independent logical volume in a multiple layer based file system in the storage module, and run the container using each of the plurality of allocated sub images.

The method according to the present disclosure may be implemented as the computer readable code in the computer readable recording medium. The computer readable recording medium includes all kinds of recording media storing data which may be deciphered by a computer system. For example, the recording media may include a read only memory (ROM), a random access memory (RAM), a magnetic tape, a magnetic disk, a flash memory, an optical data storage device, etc. Further, the computer readable recording media may be stored and executed as codes which may be distributed in the computer system connected through a computer communication network and read by a distribution method.

Hereinabove, the present disclosure has been described with reference to the drawings and exemplary embodiments, but it is not meant that the protection scope of the present disclosure is limited by the drawings or exemplary embodiments, but those skilled in the art will understand that the present disclosure can be variously modified and changed without departing from the spirit and the scope of the present disclosure which are defined in the appended claims.

Specifically, described features may be executed in a digital electronic circuit, computer hardware, firmware, or combinations thereof. The features may be executed in a computer program product implemented in a storage apparatus in a machine readable storage device for execution by a programmable processor. In addition, the features may be performed by a programmable processor operating on input data and executing programs of directives for performing functions of the exemplary embodiments described by generating an output. The described features may be executed in one or more computer programs which may be executed on a programmable system including at least one programmable combined processor, at least one input device, and at least one output device in order to receive data and directives from a data storage system and in order to transmit the data and the directives to the data storage system. The computer program includes a set of directives which may be directly or indirectly used in the computer in order to perform a specific operation with respect to a predetermined result. The computer program may be written in any form among programming languages including compiled and interpreted languages and used as another unit suitable for use in a module, a device, a subroutine, or another computer environment or as any form included as an independent operable program.

Appropriate processor for executing the programs of the directives include, for example, both universal and special-purpose microprocessors and a single processor or one of multiple processors of different types of computers. Further, storage devices suitable for computer program directives and data implementing the described features include all types of non-volatile memories including semiconductor memory devices such as EPROM, EEPROM, and flash memory devices, magnetic devices such as internal hard disks and removable disks, optical magnetic disks, and CD-ROM and DVD-ROM disks. The processor and the memory may be integrated in application-specific integrated circuits (ASICs) or added by the ASICs.

The aforementioned present disclosure is described based on a series of functional blocks, but not limited to the aforementioned embodiments and the accompanying drawings, and it will be obvious to those skilled in the technical field to which the present disclosure pertains that various substitutions, modifications, and changes may be made within the scope without departing from the technical spirit of the present disclosure.

A combination of the exemplary embodiments is not limited to the aforementioned exemplary embodiment and various forms of combinations may be provided in addition to the aforementioned exemplary embodiments according to implementation and/or a need.

In the aforementioned exemplary embodiments, methods have been described based on flowcharts as a series of steps or blocks, but the methods are not limited to the order of the steps of the present disclosure and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present disclosure and may be deleted.

The aforementioned exemplary embodiment includes various aspects of examples. All possible combinations for showing various aspects may not be described, but those skilled in the art may recognize that different combinations are possible. Accordingly, it will be intended that the present disclosure all other replacements, modifications, and changes which belong to the following claims.

What is claimed is:

1. A method for operating a storage driver, which is performed by a storage driver apparatus comprising a processor in a container environment, the method comprising:
   requesting, by the processor, downloading of an image for running a container;
   downloading, by the processor, a plurality of sub images associated with the requested image;
   allocating, by the processor, the plurality of sub images to a plurality of independent logical volumes included in a physical volume in a multi-layer based file system;
   storing, by the processor, the plurality of sub images in the plurality of independent logical volumes included in the physical volume; and
   running, by the processor, the container using the plurality of sub images stored in the plurality of independent logical volumes included in the physical volume,
   wherein the running of the container using the plurality of sub images includes:
      accessing each of the plurality of independent logical volumes corresponding to at least one of the plurality of sub images selected among the plurality of sub images; and
      running instructions of the container corresponding to at least one of the plurality of sub images stored in each of the plurality of independent logical volumes.

2. The method of claim 1, wherein in the requesting of the downloading of the image, running of a Docker is requested using a predetermined image and downloading of an image for running the container is requested through a Docker engine of the run Docker.

3. The method of claim 1, wherein in the allocating of the independent logical volume, the plurality of downloaded sub images are allocated to at least one lower layer, an upper layer, and a volume layer independently separated in the multi-layer based file system, respectively.

4. The method of claim 3, wherein in the multi-layer based file system, at least one lower layer is only readable, the upper layer is readable and writable, and the volume layer is sharable between the containers.

5. The method of claim 3, wherein the at least one lower layer, the upper layer, and the volume layer operate like one file system using a Union file system.

6. The method of claim 3, wherein in the allocating of the independent logical volume, the downloaded sub images are sequentially stored in the at least one lower layer.

7. The method of claim 3, wherein in the running of the container, a write request is stored in the upper layer, which is generated while the container is run.

8. The method of claim 3, wherein in the running of the container, a life cycle of the upper layer is managed the same as the life cycle of the container.

9. The method of claim 3, wherein in the running of the container, the volume layer is changed according to a command by a user of the storage driver.

10. The method of claim 1, wherein in the allocating of the independent logical volume, each of the plurality of downloaded sub images is allocated to the independent logical volume using a storage driver interface of the Docker.

11. A storage driver apparatus in a container environment, comprising:
a storage module including an independent logical volume in a multi-layer based file system;
a memory storing at least one program; and
a processor connected to the storage module and the memory,
wherein the processor runs the at least one program to:
request downloading of an image for running a container,
download a plurality of sub images associated with the requested image,
allocate the plurality of sub images to a plurality of independent logical volumes included in a physical volume in a multi-layer based file system,
store the plurality of sub images in the plurality of independent logical volumes included in the physical volume, and
run the container using the plurality of sub images stored in the plurality of independent logical volumes included in the physical volume, and
wherein the processor is configured to:
access each of the plurality of independent logical volumes corresponding to at least one of the plurality of sub images selected among the plurality of sub images; and
run instructions of the container corresponding to at least one of the plurality of sub images stored in each of the plurality of independent logical volumes.

12. The storage driver apparatus of claim 11, wherein the processor requests running of a Docker using a predetermined image and requests downloading of an image for running the container through a Docker engine of the run Docker.

13. The storage driver apparatus of claim 11, wherein the processor allocates the plurality of downloaded sub images to at least one lower layer, an upper layer, and a volume layer independently separated in the multi-layer based file system, respectively.

14. The storage driver apparatus of claim 13, wherein in the multi-layer based file system, at least one lower layer is only readable, the upper layer is readable and writable, and the volume layer is sharable between the containers.

15. The storage driver apparatus of claim 13, wherein the at least one lower layer, the upper layer, and the volume layer operate like one file system using a Union file system.

16. The storage driver apparatus of claim 13, wherein the processor sequentially stores the downloaded sub images in the at least one lower layer.

17. The storage driver apparatus of claim 13, wherein the processor stores a write request in the upper layer, which is generated while the container is run.

18. The storage driver apparatus of claim 13, wherein the processor manages a life cycle of the upper layer the same as the life cycle of the container.

19. The storage driver apparatus of claim 13, wherein the processor changes the volume layer according to a command by a user of the storage driver.

20. The storage driver apparatus of claim 11, wherein the processor allocates each of the plurality of downloaded sub images to the independent logical volume using a storage driver interface of the Docker.

* * * * *